UNITED STATES PATENT OFFICE.

EDGAR F. REED, OF DORCHESTER, MASSACHUSETTS, ASSIGNOR TO LIQUID WALL PAPER COMPANY, OF BOSTON, MASSACHUSETTS, A CORPORATION OF MASSACHUSETTS.

WALL-COATING COMPOSITION.

No. 796,604. Specification of Letters Patent. Patented Aug. 8, 1905.

Application filed April 24, 1905. Serial No. 257,271.

*To all whom it may concern:*

Be it known that I, EDGAR F. REED, a citizen of the United States, residing at Dorchester, in the county of Suffolk and State of Massachusetts, have invented certain new and useful Improvements in Wall-Coating Compositions, of which the following is a specification.

As is well known, the coating of paper with various chemicals and the preparation of wall-papers in many forms has already been the subject of extensive investigation, experiments, and numerous patents; but this invention has for its object the production of a new composition for wall-paper by bringing together certain substances well known in chemistry, as hereinafter described.

I am aware that three of the ingredients of my composition have been used together; but I am not aware that all of the ingredients (nor a composition of any four of them) have been used together for this purpose or for any other purpose.

My composition consists of the following ingredients combined in the proportions stated, viz: water, (substantially pure,) $H_2O$, one gallon; flour, one quart; alum, one ounce; Irish moss, one-half pound; glycerin, $C_3H_5(OH)_3$, one-half ounce; flock, one-half pound.

In carrying out my invention I first take the flour and mix the same with a little water, making a thick paste, and then add the alum. I mix a little water with the Irish moss, and then add it to the mixture of flour and alum. When thoroughly mixed, I add the glycerin and then the flock and apply the water in a boiling form to this mixture and thoroughly mingle them by agitation, and the same forms an adhesive mixture suitable to be applied upon the walls direct and can be properly termed a "liquid wall-paper," as the same is applied to the walls or ceilings in a liquid or paste form with a brush or trowel and when dried forms a wall-paper free from seams. When properly mixed and applied, it will not fade or crack and can be repaired without showing the repair-work.

This paste mixture is very desirable for design, free-hand, relief, tile, or stucco work, and it is free from smell, non-poisonous, and non-combustible.

What I claim, and desire to secure by Letters Patent of the United States, is—

1. The herein-described composition of matter, consisting of water, flour, alum, and flock, substantially as described and for the purposes specified.

2. The herein-described composition of matter, consisting of flour, alum, water, glycerin, and Irish moss, substantially as described and for the purposes specified.

3. The herein-described composition of matter, consisting of water, flour, alum, glycerin and flock, substantially as described and for the purposes specified.

4. The herein-described composition of matter for mixing with flock in forming a liquid wall-paper, consisting substantially of the following ingredients, water one gallon, flour one quart, alum one ounce, Irish moss one-half pound, glycerin one ounce.

In testimony whereof I affix my signature in presence of two witnesses.

EDGAR F. REED.

Witnesses:
CHARLES F. A. SMITH,
FRANK D. CAGAR.